Patented Apr. 6, 1954

2,674,588

UNITED STATES PATENT OFFICE 2,674,588

MOLDING COMPOSITIONS OF POLYMERS OF MONOVINYL AROMATIC HYDROCARBONS AND CYCLIC ALCOHOL STABILIZERS

Raymond M. Price, Midland, and Arthur F. Roche, Freeland, Mich., assignors to The Dow Chemical Company, Midland, Mich., a corporation of Delaware No Drawing. Application March 1, 1952, Serial No. 274,504

12 Claims. (Cl. 260—45.95)

This invention concerns improved molding compositions comprising a thermoplastic polymer, of one or more monovinyl aromatic hydrocarbons having incorporated therewith a stabilizing agent for suppressing the tendency toward discoloring of the polymer on heating the same to high temperatures during usual injection and compression molding operations. It pertains especially to molding compositions composed principally of polystyrene and a minor proportion of a cyclic alcohol, e. g. cyclohexanol, and relates to a method of making the compositions.

When polystyrene is heated to temperatures above its melting point, e. g. at temperatures between 220° and 300° C., such as are commonly used in molding the granular polymer by usual injection molding procedure, the molded articles frequently possess a yellow color or fluorescence which is displeasing to the eye. The formation of such color in the polymer results in a number of the molded articles being rejected as waste or scrap material, which cannot be recovered, or reworked, except into molded articles wherein the undesirable color is masked by pigments or other coloring agents. Traces of air or oxygen, such as may be entrapped in the granular polystyrene when a charge of the same is fed into the chamber of an injection molding machine, often is sufficient to cause objectionable discoloration of the polystyrene when the latter is heat-plastified, or heated to a temperature above its melting point, and is subsequently molded to form a shaped article.

It has been observed that polystyrene frequently possesses an undesirable yellow color or fluorescence when monomeric styrene is polymerized in bulk in any usual way, e. g. by heating monomeric styrene in a closed container at temperatures between 80° and 150° C. until the polymerization is about 90 per cent complete, and the mass is thereafter heated to higher temperatures such as temperatures of from 200° to 260° C. to polymerize the remaining portion of the monomeric styrene. The yellow color is usually concentrated in the polymer near the surface in contact with vapor, or any gases, in the polymerization vessel and appears to be dependent for the most part upon the amount of air, or oxygen, which is in contact with, or is dissolved in, the monomeric styrene which is polymerized.

We have found that the tendency of a thermoplastic polymer of a monovinyl aromatic hydrocarbon, e. g. styrene, toward discoloring upon heating the polymer to its melting temperature or above in the presence of traces of air or oxygen can be completely suppressed, or substantially reduced, by incorporating with the polymer a small amount, e. g. 3 per cent by weight or less, of a cyclic alcohol composed only of carbon, hydrogen and oxygen atoms such as cyclohexanol, or an alkyl, aryl, aralkyl, or cyclohexyl, derivative thereof.

Any cyclic alcohol containing not more than 14 carbon atoms in the molecule and having the general formula:

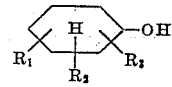

wherein $R_1$, $R_2$ and $R_3$ each represents a member of the group consisting of hydrogen atoms, lower alkyl radicals containing from 1 to 4 carbon atoms, and aryl, aralkyl and cycloalkyl radicals each having a carbocyclic ring containing six carbon atoms may be employed as a stabilizing agent for the aforementioned polymers. Examples of suitable cyclic alcohols are cyclohexanol, 2-methylcyclohexanol, 3-methylcyclohexanol, 4-methylcyclohexanol, 2-ethylcyclohexanol, 4-ethylcyclohexanol, 3-isopropylcyclohexanol, 4-tertiary-butylcyclohexanol, 2-sec.-butylcyclohexanol, diethylcyclohexanol, trimethylcyclohexanol, triethylcyclohexanol, benzylcyclohexanol, phenylcyclohexanol, 2-cyclohexylcyclohexanol, 4-cyclohexylcyclohexanol, tolylcyclohexanol, 2-methyl-4-tertiary-butylcyclohexanol, 2-methyl-4-ethylcyclohexanol, xylylcyclohexanol, 2-methyl-4-ethylcyclohexanol and diisopropylcyclohexanol. Mixtures of any two or more of such cyclic alcohols may also be used.

The cyclic alcohol, e. g. cyclohexanol, is used in amount corresponding to from 0.04 to 3 per cent by weight of the polymer employed, i. e. in amount such as to avoid causing a deleterious effect on the molding characteristics of the polymer, and less than is required to cause excessive lowering of its mechanical properties such as heat distortion temperature or tensile strength. Best results are usually obtained by employing an amount of the cyclic alcohol corresponding to from 0.1 to 2 per cent by weight of the polymer.

Polystyrene is the preferred polymeric component of the compositions although the solid thermoplastic polymers and copolymers of other monovinyl aromatic hydrocarbons of the benzene series having the vinyl radical directly attached to a carbon atom of the aromatic nucleus, such as orthomethylstyrene, meta-methylstyrene, para-methylstyrene, metaethylstyrene, para-isopropylstyrene, 2-methyl-4-ethylstyrene, 2,4-dimethylstyrene, or 2-methyl-4-isopropylstyrene, may be used. Copolymers of any two or more of such ar-alkyl-monovinyl aromatic hydrocarbons with each other or with styrene may also be used.

The molding compositions may be prepared by incorporating the cyclic alcohol, e. g. cyclohexanol or a derivative thereof, with a monomeric monovinyl aromatic hydrocarbon, e. g. styrene, or a mixture of any two or more of the aforementioned copolymerizable monovinyl aromatic hydrocarbons and thereafter polymerizing the mixture in bulk, i. e. in the substantial absence of an inert liquid medium, in the presence or absence of a polymerization catalyst. Polymerization of the mixture is usually continued until the monomers are nearly all polymerized, e. g. until a solid polymer containing less than 2 per cent by weight of unreacted monomers is obtained.

Such polymerization of the monovinyl aromatic hydrocarbon to form a normally solid thermoplastic polymeric product, e. g. a molding grade polystyrene, may be carried out by heating a solution of the monovinyl aromatic hydrocarbon and the cyclic alcohol at temperatures between 80° C. and 150° C. until 85 per cent or more of the monovinyl aromatic hydrocarbon is polymerized and thereafter heating the mass at a higher temperature, e. g. at temperatures between 160° and 225° C., to complete the polymerization to a stage at which the polymeric product contains less than two percent by weight of monomers.

As alternative procedures, the cyclic alcohol may be mixed with the polymer in granular form and the mixture be agitated by a rolling or tumbling operation until the added ingredient is uniformly distributed over surfaces of the polymer granules. The cyclic alcohol becomes incorporated with the polymer during subsequent molding or extrusion of the treated polymer. Again the cyclic alcohol may be incorporated with the thermoplastic monovinyl aromatic hydrocarbon polymer by heating a mixture of the granular polymer and the cyclic alcohol in the desired proportions to a heat-plastified temperature and agitating the mixture, e. g. by milling on compounding rolls, or by an extruding action, to blend the components into a uniform composition, which is thereafter cooled and crushed to a granular form.

The compositions are preferably prepared by dissolving the cyclic alcohol in a polymerizable monomeric vinyl aromatic hydrocarbon in the desired proportions and thereafter heating the solution in bulk and in the substantial absence of air or oxygen to polymerize the monovinyl aromatic hydrocarbon. The polymeric composition is thereafter cut or ground to a granular form suitable for use as a molding powder.

The following examples illustrate ways in which the principle of the invention has been applied, but are not to be construed as limiting the invention.

EXAMPLE 1

In each of a series of experiments, a charge of 100 grams of monomeric styrene, together with cyclohexanol, or a cyclohexanol derivative, in amount as stated in the following table, was sealed in a glass tube 12 inches long having an internal diameter of 1.25 inches. The tubes were sealed without evacuating so that air occupied the free space therein. The styrene was polymerized by heating the sealed tubes at a temperature of 100° C. over a period of 13 days. Thereafter, the polystyrene was heated in the sealed tube at a temperature of 275° C. for a period of 24 hours, then heated at 300° C. for a further period of 24 hours. The tubes were cooled and the polymer removed. The polymer from each of the experiments was crushed to a granular form. A portion of each polymer was dissolved in toluene to form a solution containing 10 per cent by weight of the product. The yellow color of the polymer was determined by measuring the per cent of light transmitted through the solution in a standard one centimeter cell at wave lengths of 620 millimicrons and 420 millimicrons, respectively. Table I names the cyclohexanol compound and gives the parts by weight of the same and the styrene used in preparing each composition. The table also gives the percent yellow color determined for each product. The per cent yellow color is reported as the difference between the per cent of light transmitted through the solution of the polymer in toluene at wave lengths of 620 millimicrons, and 420 millimicrons, respectively, divided by the per cent of light transmitted at a wave length of 620 millimicrons, and multiplied by 100. For purpose of comparison, styrene was polymerized and heated under the same time and temperature conditions in the absence of a cyclohexanol compound.

*Table I*

| Run No. | Starting Materials | | Styrene Parts | Polymeric Product, Percent Yellow Color |
|---|---|---|---|---|
| | Cyclohexanol Compound | | | |
| | Kind | Parts | | |
| 1 | none | 0 | 100 | 90.8 |
| 2 | cyclohexanol | 1.5 | 100 | 70.2 |
| 3 | 2-methylcyclohexanol | 1.7 | 100 | 76.7 |
| 4 | 4-tertiarybutylcyclohexanol | 2.4 | 100 | 56.9 |
| 5 | 2-cyclohexylcyclohexanol | 2.8 | 100 | 53.2 |
| 6 | 2-phenylcyclohexanol | 2.8 | 100 | 71.1 |

EXAMPLE 2

In each of a series of experiments a charge of 100 grams of monomeric styrene, together with 4-cyclohexylcyclohexanol in amount as stated in the following table was sealed in a glass tube 12 inches long and having an internal diameter of 1.25 inches. Each tube was sealed without evacuating so that air occupied the free space therein. The styrene was polymerized by heating the same in the sealed tube at a temperature of 110° C. for a period of 2 days, followed by heating at 150° C. for a period of 6 hours. Thereafter, the polystyrene was heated in the sealed tube at a temperature of 250° C. for a period of 24 hours, then heated at 275° C. for a further period of 8 hours. After cooling, the polymer from each of the experiments was removed from the tube and crushed to a granular form. The per cent yellow color for each polymeric composition was determined as described in Example 1. Table II identifies each composition by stating the parts by weight of the 4-cyclohexylcyclohexanol and styrene from which it was prepared. The table also gives the per cent yellow color determined for each composition.

Table II

| Run No. | Starting Materials | | Polymeric Product, Percent Yellow Color |
|---|---|---|---|
| | 4-Cyclohexyl Cyclohexanol Parts | Styrene Parts | |
| 1 | 0 | 100 | 67.3 |
| 2 | 0.05 | 100 | 24.7 |
| 3 | 0.10 | 100 | 17.1 |
| 4 | 0.40 | 100 | 16.2 |
| 5 | 1.60 | 100 | 12.8 |

EXAMPLE 3

In each of a series of experiments, a charge of 36 grams of monomeric styrene, together with a trimethylcyclohexanol in the relative proportion as stated in the following table was sealed in a glass tube 12 inches long and having an internal diameter of 1.25 inches. Each tube was sealed without evacuating so that air occupied the free space therein. The styrene was polymerized by heating the same in the sealed tube at a temperature of 100° C. for a period of 7 days. Thereafter, the polystyrene was heated in the sealed tube at a temperature of 250° C. for a period of 26 hours, then cooled. The polymer from each of the experiments was removed from the tube and was crushed to a granular form. A portion of each polymer was dissolved in toluene to form a solution containing 10 per cent by weight of the polymer. The per cent yellow color for each polymeric composition was determined as described in Example 1. The trimethylcyclohexanols employed in the experiments were racemic mixtures of the cis and trans forms of 3,3,5-trimethylcyclohexanol-1 identified as: (1) a high-melting form boiling at a temperature of 189.2° C. at 760 millimeters absolute pressure, having an index of refraction $n_D^{60°}=1.4407$, a specific gravity of 0.8643 at 60° C. compared to water at 20° C., and a freezing point of 55.8° C.; and (2) a low-melting form boiling at 197.6° C. at 760 millimeters absolute pressure, having an index of refraction $n_D^{40}=1.4478$, a specific gravity of 0.8778 at 40° C. compared to water at 20° C., and a freezing point of 37° C. For convenience, the terms "high-melting" and "low-melting" are employed in the table to indicate the form of the 3,3,5-trimethylcyclohexanol-1 used in each experiment. Table II identifies each composition by stating the form of 3,3,5-trimethylcyclohexanol-1 and gives the relative proportion thereof, together with the parts by weight of styrene, used in each experiment. The table also gives the per cent yellow color determined for each polymeric product.

Table III

| Run No. | Starting Materials | | Polymeric Product, Percent Yellow Color |
|---|---|---|---|
| | 3,3,5-trimethylcyclohexanol-1 | Styrene gms. | |
| | gms. | | |
| 1 | none | 0 | 100 | 35.3 |
| 2 | Low-melting | 1 | 100 | 22.6 |
| 3 | High-melting | 1 | 100 | 16.0 |

Other modes of applying the principle of the invention may be applied instead of those explained, change being made as regards the compositions or method herein disclosed, provided the ingredients or steps stated in any of the following claims or the equivalent of such ingredients or steps be employed.

We claim:

1. A molding composition comprising as the essential components a thermoplastic polymer of a monovinyl aromatic hydrocarbon having incorporated therewith from 0.04 to 3 per cent by weight of at least one cyclic alcohol containing not more than 14 carbon atoms in the molecule and having the general formula:

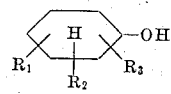

wherein $R_1$, $R_2$ and $R_3$ represents a member of the group consisting of hydrogen atoms, lower alkyl radicals containing from 1 to 4 carbon atoms, and aryl, aralkyl and cycloalkyl radicals each having a carbocyclic ring containing 6 carbon atoms.

2. A molding composition comprising polystyrene having incorporated therewith from 0.04 to 3 per cent by weight of cyclohexanol.

3. A molding composition comprising polystyrene having incorporated therewith from 0.04 to 3 per cent by weight of a methylcyclohexanol.

4. A molding composition comprising polystyrene having incorporated therewith from 0.04 to 3 per cent by weight of a tertiarybutylcyclohexanol.

5. A molding composition comprising polystyrene having incorporated therewith from 0.04 to 3 per cent by weight of a cyclohexylcyclohexanol.

6. A molding composition comprising polystyrene having incorporated therewith from 0.04 to 3 per cent by weight of 3,3,5-trimethylcyclohexanol.

7. In a method of making a molding composition wherein a monovinyl aromatic hydrocarbon is polymerized in the substantial absence of an inert liquid medium to form a thermoplastic polymer, the steps of incorporating with the monovinyl aromatic hydrocarbon from 0.04 to 3 per cent by weight of a cyclic alcohol containing not more than 14 carbon atoms in the molecule and having the general formula:

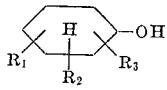

wherein $R_1$, $R_2$ and $R_3$ represents a member of the group consisting of hydrogen atoms, lower alkyl radicals containing from 1 to 4 carbon atoms, and aryl, aralkyl and cycloalkyl radicals each having a carbocyclic ring containing 6 carbon atoms, and polymerizing the thus treated monovinyl aromatic hydrocarbon by heating the mixture in bulk in a closed container.

8. In a method of making a molding composition wherein styrene is polymerized in the substantial absence of an inert liquid medium to form a thermoplastic polymer, the steps of incorporating with the styrene from 0.04 to 3 per cent by weight of cyclohexanol and polymerizing the thus treated styrene by heating the mixture in bulk in a closed container.

9. In a method of making a molding composition wherein styrene is polymerized in the substantial absence of an inert liquid medium to form a thermoplastic polymer, the steps of incorporating with the styrene from 0.04 to 3 per cent by weight of a methylcyclohexanol and polymerizing the thus treated styrene by heating the mixture in bulk in a closed container.

10. In a method of making a molding composition wherein styrene is polymerized in the substantial absence of an inert liquid medium to form a thermoplastic polymer, the steps of incorporating with the styrene from 0.04 to 3 per cent by weight of a tertiary butylcyclohexanol and polymerizing the thus treated styrene by heating the mixture in bulk in a closed container.

11. In a method of making a molding composition wherein styrene is polymerized in the substantial absence of an inert liquid medium to form a thermoplastic polymer, the steps of incorporating with the styrene from 0.04 to 3 per cent by weight of a cyclohexylcyclohexanol and polymerizing the thus treated styrene by heating the mixture in bulk in a closed container.

12. In a method of making a molding composition wherein styrene is polymerized in the substantial absence of an inert liquid medium to form a thermoplastic polymer, the steps of incorporating with the styrene from 0.04 to 3 per cent by weight of 3,3,5-trimethylcyclohexanol and polymerizing the thus treated styrene by heating the mixture in bulk in a closed container.

References Cited in the file of this patent

UNITED STATES PATENTS

| Number | Name | Date |
|---|---|---|
| 2,100,484 | Koenig | Nov. 30, 1937 |

FOREIGN PATENTS

| Number | Country | Date |
|---|---|---|
| 341,420 | Great Britain | Jan. 14, 1931 |